Dec. 19, 1967 A. J. SHYE 3,358,946
AIRCRAFT
Filed May 6, 1966 5 Sheets-Sheet 1

INVENTOR
André Jack Shye

BY
ATTORNEYS

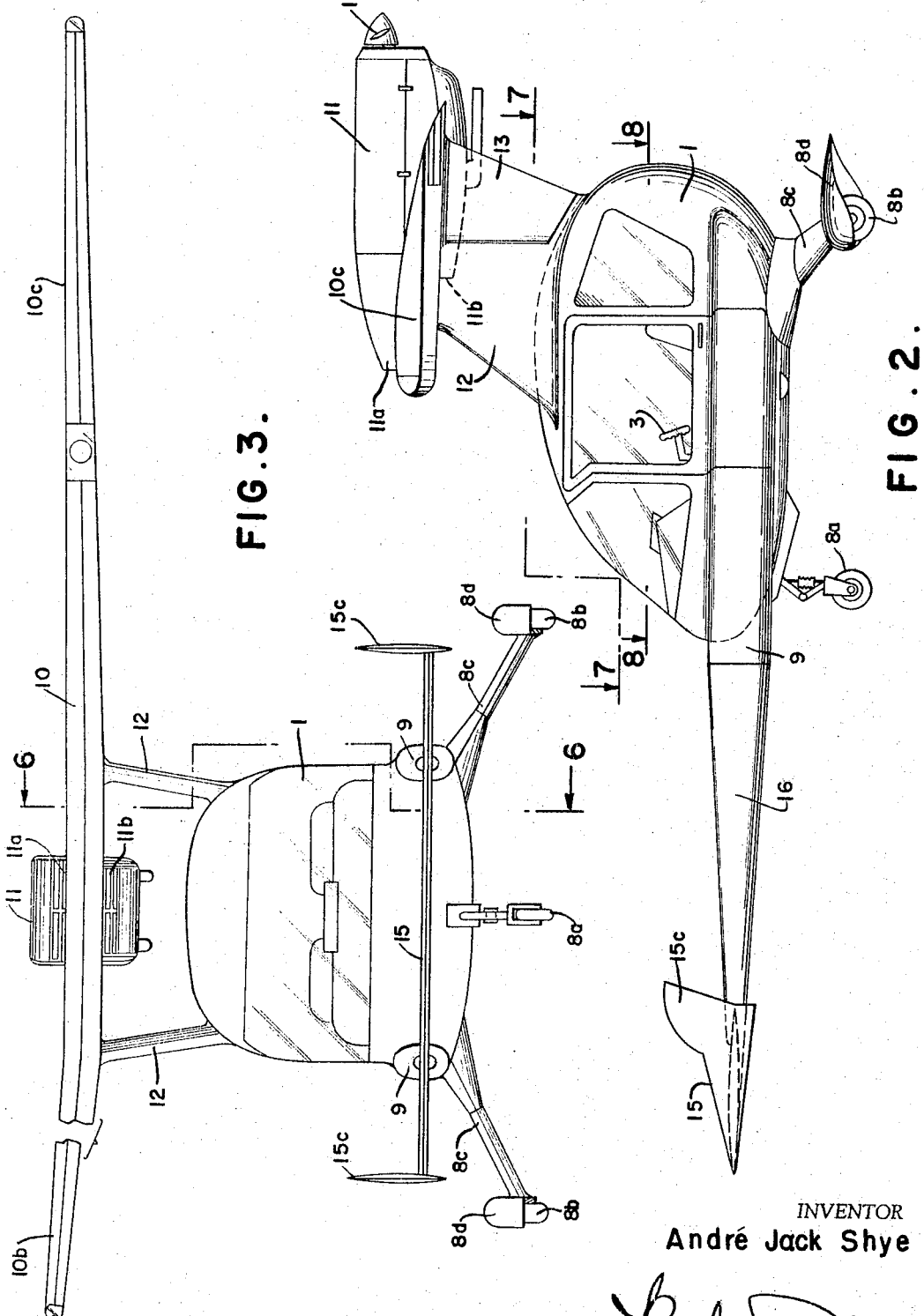

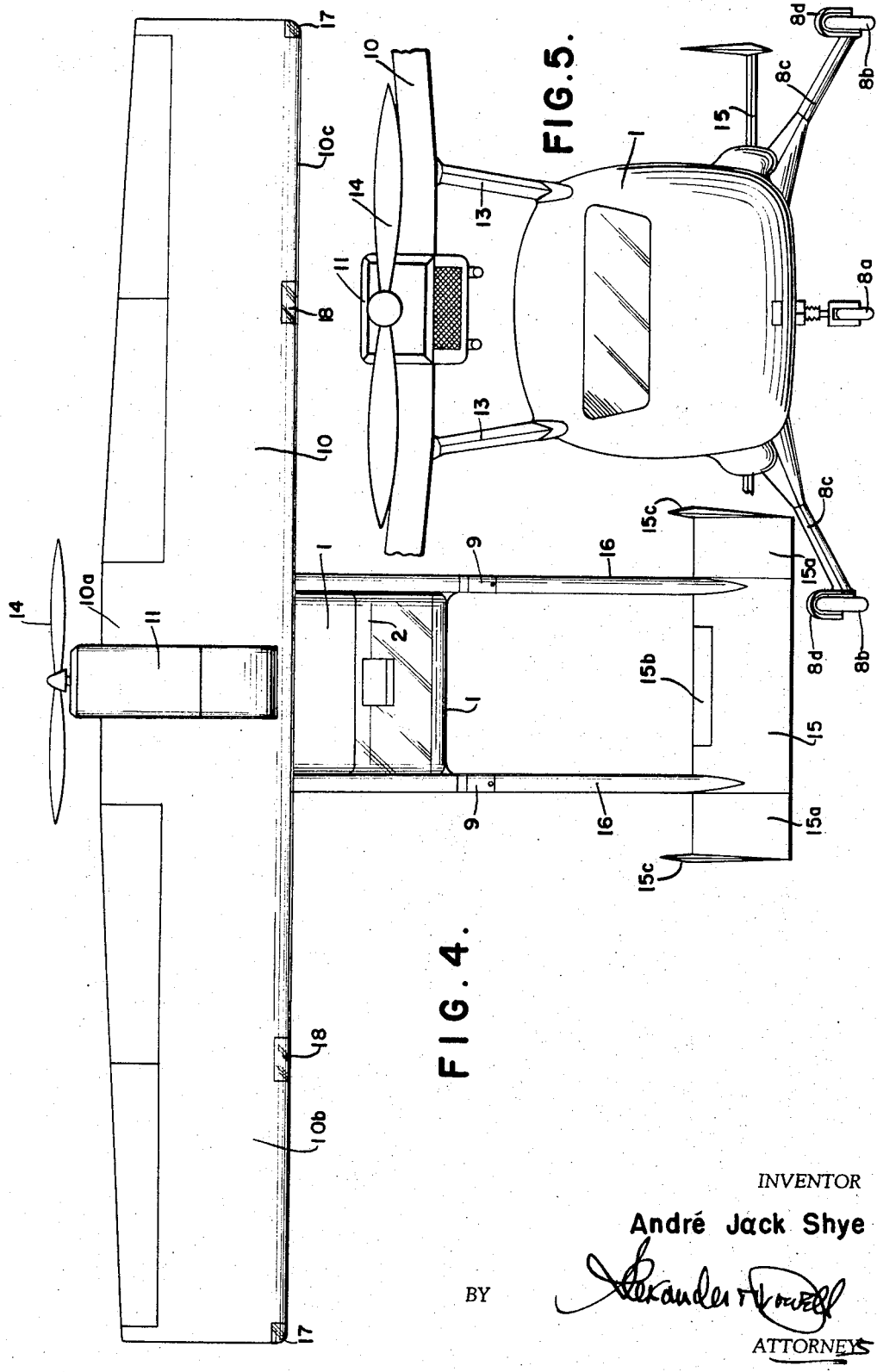

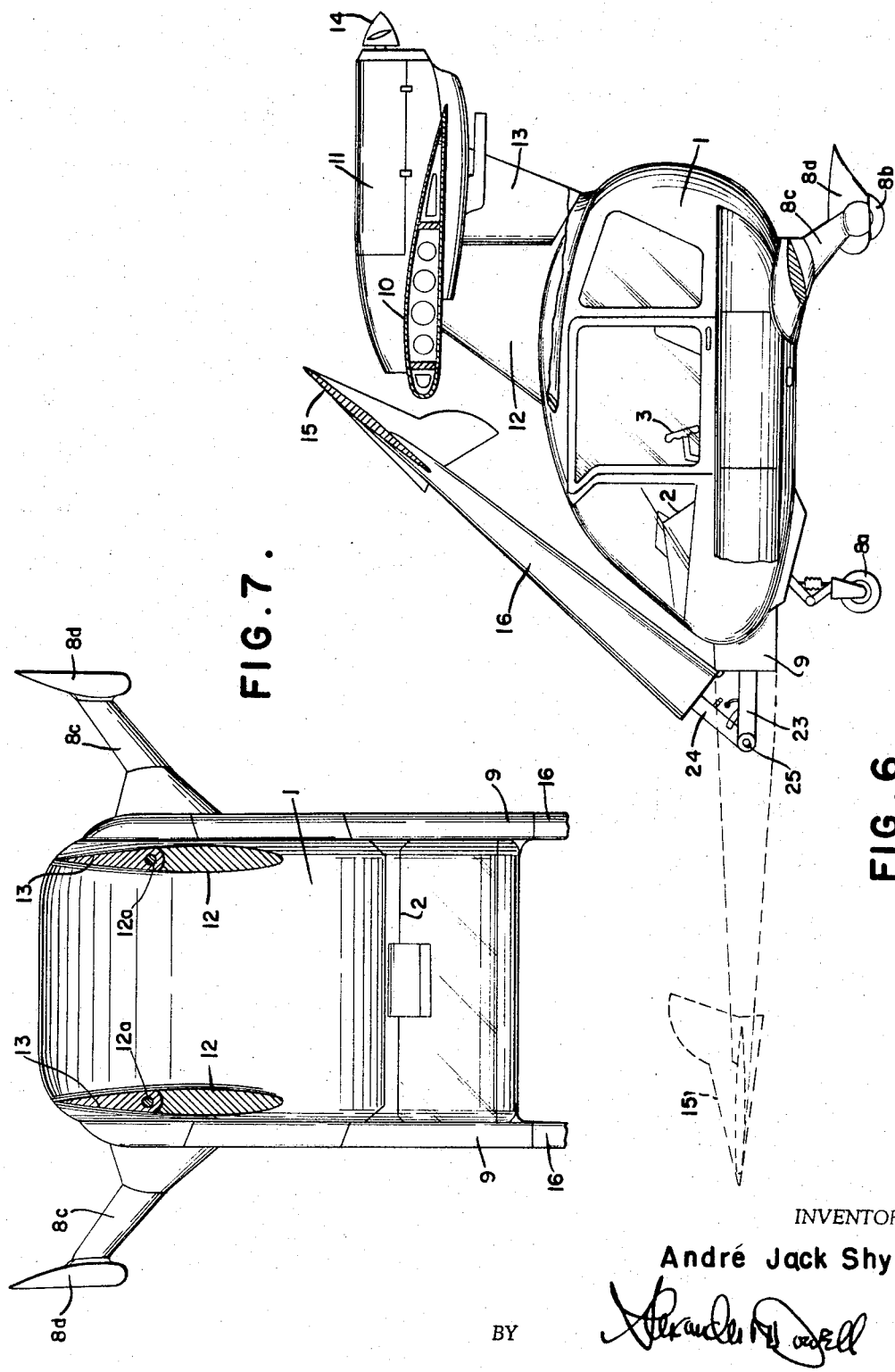

Dec. 19, 1967  A. J. SHYE  3,358,946
AIRCRAFT
Filed May 6, 1966  5 Sheets-Sheet 5
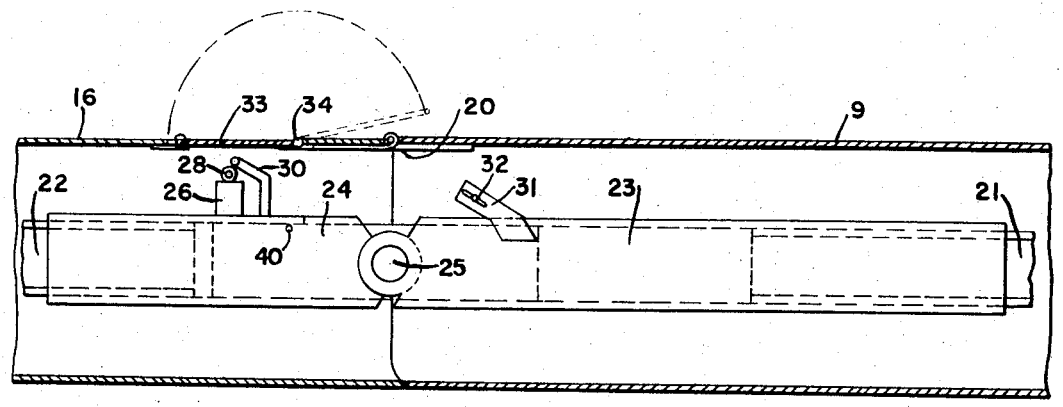
FIG. 9.
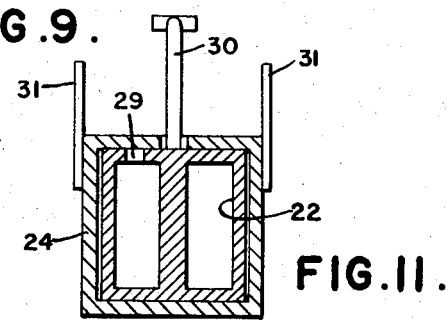
FIG. 11.
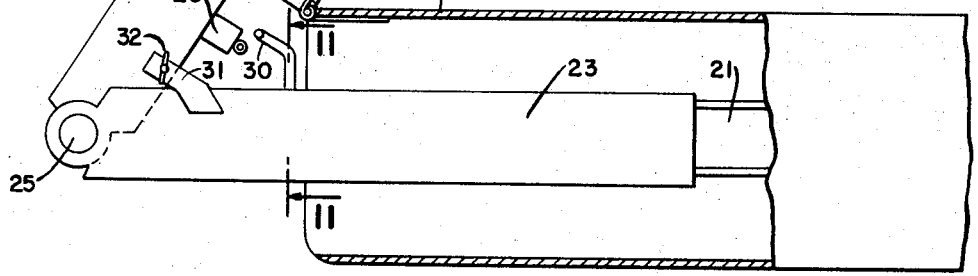
FIG. 10
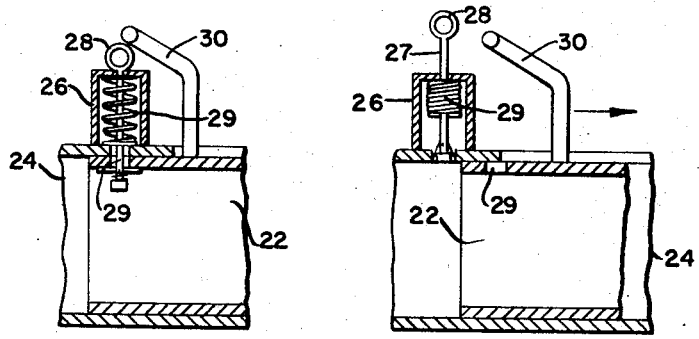
FIG. 12.  FIG. 13.
INVENTOR
André Jack Shye
BY
ATTORNEYS 
United States Patent Office 3,358,946
Patented Dec. 19, 1967

---

3,358,946
AIRCRAFT
André Jack Shye, 1336 Charleston Ave.,
Huntington, W. Va. 25701
Filed May 6, 1966, Ser. No. 548,211
12 Claims. (Cl. 244—13)

This invention is a single engine, push type, modified canard design aircraft having a tricycle landing gear and comparable in size to a 1963 Cessna Skymaster, the same having a single mono-wing composed of three sections including right and left outboard sections and a center section, the engine being located in the center section of the wing which is disposed above and behind the leading edge of the fuselage.

One object of the invention is to provide a fuselage for the aircraft which is a self-contained unit containing the instrument panel located in the leading portion of the fuselage, the flight controls, the pilot's seat, the passengers' seats, and the baggage compartments; and the fuselage serving as a central supporting unit for the landing gear mounting, also for the booms which support the horizontal stabilizer; and also serving as an attachment for the vertical stabilizers which support the wing. Its outstanding feature is increased visibility over comparable aircraft on the market today due to the fuselage permitting almost unlimited visibilty, by absence of an engine nacelle.

Another object is to provide a landing gear therefor which is a non-retractable tricycle adaptation arranged as wide-spaced as possible for ground stability, and in which the main gear incorporates high-speed wheel fairings which streamlines, but allows snow, slush, mud, etc., to be readily dispersed.

Another object is to provide a fuselage with forwardly extending booms attached to either side thereof and serving to support the horizontal stabilizer in a fixed position, the booms having separation points that are hinged and are located just forward of the leading edge of the fuselage to allow the leading area of the booms and the horizontal stabilizer to be folded upwardly and backwardly into a vertical position for convenience in storage in a limited area.

A further object is to provide a horizontal stabilizer which as compared to conventional stabilizers is located forwardly of the fuselage instead of aft, the horizontal stabilizer being located forward of the leading edge of the fuselage and being supported by twin booms. This is accomplished by rigid box-type construction. A primary advantage of this arrangement is the elimination of the elevator from the turbulence of the prop wash of the aircraft. The elevators are located outboard of the center section of the horizontal stabilizer, the center section representing the area between the twin booms. The location of the elevators is determined due to the ground effect on the horizontal stabilizer. By having the elevators outboard it will cause the horizontal stabilizer to stall more quickly and will help eliminate floating in an attempted landing. This floating tendency is caused by relative velocity of the airfoil over the ground surface creating an increased pressure on the bottom side of the horizontal stabilizer, due to compression of the air between the ground and the airfoil. The elevator also incorporates a trim tab for balanced flight.

A further object is to provide vertical stabilizers disposed at the connection points between the fuselage and the center section of the wing. They are located on the left side and right side of the top section of the fuselage and are two in number. Each unit contains a separate rudder which is located on the aft portion of the vertical stabilizer. The stabilizers form a venturi which gives more positive control stability.

A still further object is to provide a wing supported by the two vertical stabilizers. It is composed of three sections, i.e., a center section, and two outboard sections. It contains two navigation lights, a landing light, and a taxi light, and all fuel cells. It also serves as a mounting for the engine in the center section. As does a standard wing it also contains the aileron and flap systems. The navigation lights meet the rules of the FAA by being on the left and right forward sections of the wing, and the white light on the aft portion of the fuselage. The advantage of the engine location is for a quieter operation from the passenger standpoint. The aft location and the separation from the fuselage of the engine make it much quieter in comparison to other aircraft of the single engine category. The propeller in the rear creates more efficient operation, and eliminates rock damages to the propeller blades. The engine is ventilated with ducts in the leading edge of the nacelle.

My aircraft designed as above described has emphasis on compactness, since everything is a self-contained unit contributing to efficient operation. Emphasis is on its light-weight brought about by the aircraft's compactness, and also on stability; and furthermore no control surface is disposed in disturbed air, or in any prop wash.

Other minor objects of the invention will be hereinafter set forth.

I will explain the invention with reference to the accompanying drawings which illustrate one practical embodiment thereof, to enable others familiar with the art to adopt and use the same, and will summarize in the claims the novel features of construction, and novel combinations of parts, for which protection is desired.

In said drawings:

FIG. 2 is a side elevation thereof showing the booms extended.

FIG. 3 is a front elevational view of the aircraft.

FIG. 4 is a top plan view of the aircraft.

FIG. 5 is a rear elevational view of the aircraft.

FIG. 6 is a vertical sectional view through the aircraft on the line 6—6, FIG. 3, showing in dotted lines the booms extended, and showing in full lines the booms hinged into raised or folded position.

FIG. 7 is a horizontal section on the line 7—7, FIG. 2.

FIG. 9 is an enlarged section through the hinge connection of one of the booms showing the boom sections in aligned position.

FIG. 10 is a view similar to FIG. 9, but showing the boom sections in hinged relation.

FIG. 11 is an enlarged section on the line 11—11, of FIG. 10.

FIGS. 12 and 13 are enlarged detail views.

Figure 8:
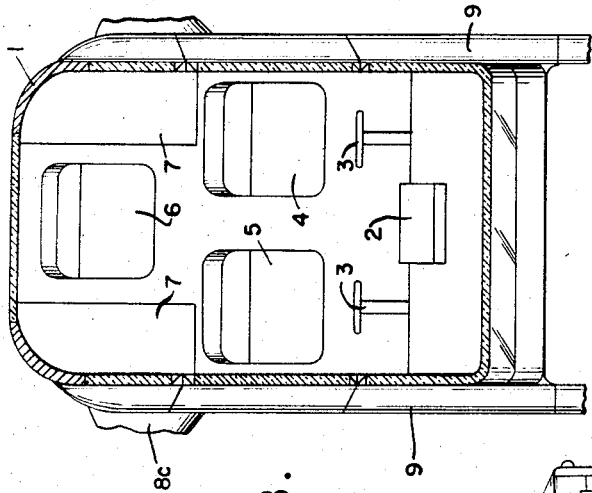
FIG. 8 is a horizontal section on the line 8—8, FIG. 2.
Figure 1:
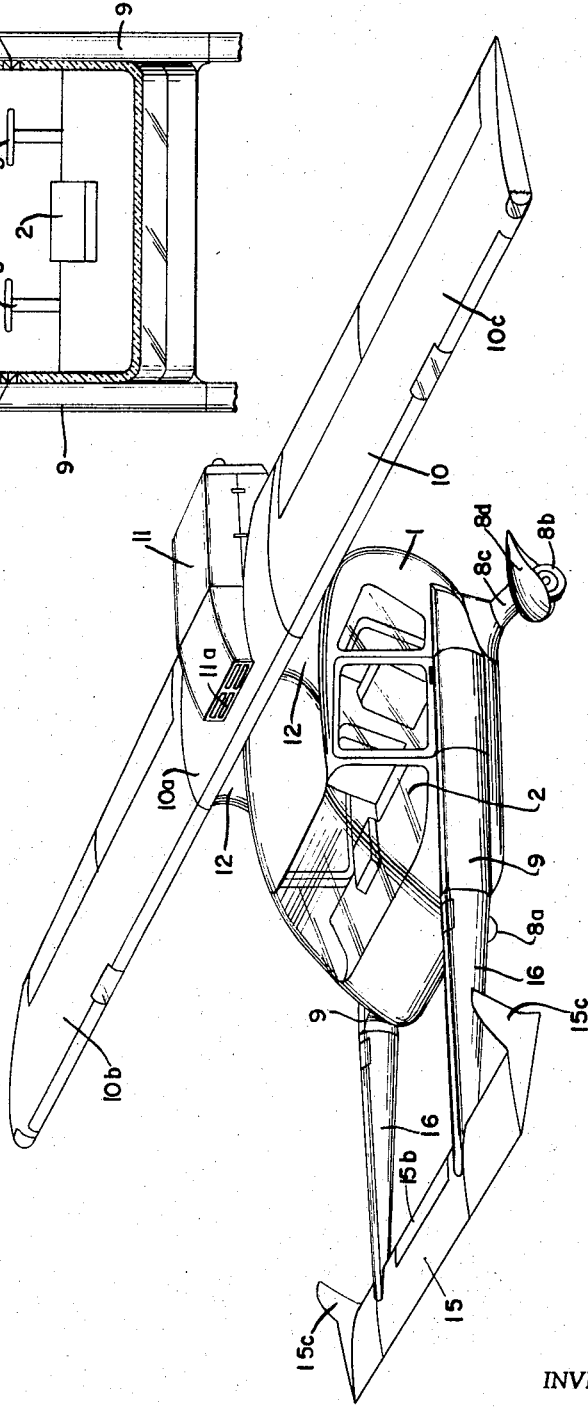
FIG. 1 is a front perspective view of my novel aircraft.

As shown in the drawings, my novel aircraft is of single-engine push-type modified canard design comprising a fuselage 1 which is a self-contained unit, said fuselage having suitably arranged windows and doors therein as shown, and having at the front portion of the fuselage an instrument panel 2, the flight controls 3, the pilot's seat 4, and passenger seats 5 and 6; also baggage compartments 7 as shown in FIG. 8, the fuselage serving as a central supporting unit for the landing gear 8a and 8b, and for the booms 9 which support the horizontal stabilizer 15, and for the vertical stabilizers 12 which support the wing 10. An outstanding feature of my aircraft is its increased visibility over comparable aircraft on the market today, this visibility being obtained due to the fuselage permitting almost unlimited visibility by absence of an engine nacelle.

As shown, the wing 10 is of single mono-wing type composed of three sections including a center section 10a, a right outboard section 10b, and a left outboard section 10c. The engine 11 is located in the center section 10a of the wing which is disposed above and behind the leading edge of the fuselage 1 and the wing is supported on the fuselage 1 by vertical stabilizers 12 connecting the upper outer sides of the fuselage 1 with the undersides of the center portion 10a of the wing 10, as clearly shown in FIGS. 6 and 7, the rear portions of the vertical stabilizers being pivoted as at 12a so that the rear portions of the vertical stabilizers 12 serve as rudders 13, FIGS. 2, 6 and 7. The vertical stabilizers 12 are thus disposed at the connection point between the fuselage 1 and the center section 10a of the wing, the same being located on the left side and right side of the top section of the fuselage 1 and are two in number. Each stabilizer contains a separate rudder 13 which is located on the aft portion of its respective vertical stabilizer 12, and the stabilizers together from a venturi which gives more positive control stability.

As shown, the landing gear is a tricycle type in which the nose wheel 8a and the main or side wheels 8b are arranged as widely spaced as possible for ground stability, the wheels 8b being carried by struts 8c diverging downwardly and outwardly from the rear end of the fuselage 1 at each side thereof, in order to arrange the wheels 8a, 8b as widely spaced as possible for ground stability. The main wheels 8b preferably incorporate high speed wheel fairings 8d, as shown, which fairings streamline the wheels but allow snow, slush, mud, etc., to be readily dispensed when the wheels 8b are passing over the ground.

As shown, the engine nacelle 11 is provided with two air ducts at the front end thereof, one air duct 11a being disposed above the center section 10a of the wing and the other air duct 11b being disposed below the wing section 10a, as shown in FIG. 3. The engine 11 rotates the single propeller 14 which is disposed above the rear center of the fuselage 1 and is thus driven or rotated above and behind the leading edge of the fuselage 1.

The booms 9 for the horizontal stabilizer 15 are attached to the sides respectively of the fuselage 1 extending in parallel relation forwardly of the fuselage, and serve normally to support the horizontal stabilizer 15 in fixed position, the booms 9 having separation points which are hinged as at 20, FIG. 9. The front ends of the pair of spaced parallel booms 9 terminate just forwardly of the leading edge of the fuselage 1 and extension boom sections 16 are hingedly connected as at 20 with their respective fixed boom sections 9, to allow the extension booms 16 to be swung from normal horizontal alignment with booms 9 as shown in full lines in FIG. 2, to an upwardly folded position shown in full lines in FIG. 6, for convenience when in a limited area. In normal position, the forward stabilizer 15 is thus located forwardly of the fuselage instead of aft, as in conventional stabilizers, and the horizontal stabilizer 15 is supported by the twin booms 9 and 16, the extensions 16 with the horizontal stabilizer forming a rigid box-type construction. The primary advantage of this type of arrangement is the elimination of the elevators from the turbulence of the prop-wash of the aircraft.

As shown in FIG. 4, the elevators 15a of the horizontal stabilizer 15 are located outboard of the center section of the horizontal stabilizer, the center section representing the area between the twin booms 16. The location of the elevators is determined due to the ground effect on the horizontal stabilizer. By having the elevators outboard it will cause the horizontal stabilizer to stall more quickly and will help eliminate floating in an attempted landing, this floating tendency being caused by relative velocity of the airfoil over the ground surface creating an increased pressure on the bottom side of the horizontal stabilizer, due to compression of the air between the ground and the airfoil. The elevator 15 also incorporates a trim tab 15b for balance flight. The outer sides of the horizontal stabilizer sections 15a are provided with fairings 15c, as shown in FIGS. 3 and 4.

As shown, the wing 10 is supported by two vertical stabilizers 12 and is composed of three sections, i.e., a center section 10a and two outboard sections 10b and 10c. It contains two navigation lights 17, landing light 18, taxi light and all fuel cells, and the center section of the wing also serves as a mounting for the engine 11 as does a standard wing. Wing 10 also contains the aileron and flap systems as shown, and the navigation lights meet the rules of the FAA by being on the right and forward sections of the wing, and the white light on the aft portion of the fuselage.

The advantage of the engine location is for quiet operation from the passenger standpoint. The aft location and the separation from the fuselage of the engine make it much quieter in comparison to other aircraft of the single engine category. The propeller 14 located in the rear creates more efficient operation, and eliminates rock damage to the propeller blades.

Normally, each boom section 16 would be axially aligned with the boom section 9, as indicated in FIG. 2 and in dotted lines in FIG. 6. However, provision is made whereby the boom section 16 may be hinged upwardly to overlie the front end of fuselage 1, as indicated in full lines in FIG. 6, suitable locking means being provided for holding the booms 9 and 16 aligned, and also for locking the booms in the upward position shown in full lines in FIG. 6. Such means are shown in FIGS. 9-13, FIG. 9 showing the booms 9 and 16 aligned, and FIG. 10 showing the booms 9 and 16 in hinged position.

As shown, the booms 9 and 16 are hollow and are open at their meeting ends, and the tops of the meeting ends of the booms 9 and 16 are hinged together by hinges 20, FIGS. 9 and 10. Axially disposed within the booms 9 and 16 respectively are fixed guides 21 and 22 which are fixed therein in any desired manner. On the outer end of guide 21 is an axially movable slide 23, while on the outer end of the guide 22 is a similar slide 24. The adjacent ends of the slides 23 and 24 are connected together by means of a hinge pin 25. It is obvious that as the boom sections 16 are swung upwardly on the boom sections 9 that the slides 23 and 24 will necessarily be moved on their guides 21–22 to a position offset from the meeting ends of the booms 9 and 16, as clearly shown in FIGS. 9 and 10. In FIG. 9 the hinge pin 25 is shown in the plane of the meeting ends of the booms 9 and 16, the booms being actually aligned, while in FIG. 10 the hinge pin 25 is shown displaced considerably to the left of the plane of the meeting ends of the booms 9 and 16.

The means for locking the booms 9 and 16 in aligned position consists of a locking pin 27, FIG. 13, on the slide 24 extending down through a cylindrical casing 26 through which the pin 27 passes, the pin having an eye 28 on its upper end normally seating on the top of the casing 26.

A spring 29 within the casing 26 around the pin 27 normally tends to depress the lower end of the pin 27 into a hole 29 in the top of the guide 22 when the booms 9 and 16 are aligned as in FIG. 9 to prevent axial shifting of the slides 23–24 on their guides 21–22, the locked position of the pin 27 being indicated in FIG. 12. In FIG. 13, however, the pin 27 is shown as in raised position in which its lower end is disengaged from the hole 29 in the guide 22, thereby permitting the slide 24 to be manually shifted as shown in FIG. 13 by means of a push on the handle 30, whereupon the slides 23–24 will be permitted axial movement on their guides 21–22 to permit the boom 16 to be hinged upwardly, as shown in full lines in FIG. 6, and in FIG. 10.

In order to secure the booms 16 in raised position shown in FIG. 10, I provide on opposite sides of the slide 23 adjacent the hinge pin 25 a pair of inclined straps 31, FIGS. 9, 10 and 11, which carry wing bolts 32, FIGS. 9 and 10, which are adapted to engage holes 40, FIG. 9, in the sides of the slide 24 when booms 16 are raised, as shown in FIG. 10, to maintain same in raised position and to prevent the booms from being accidentally tipped forwardly and downwardly into aligned position.

In order to provide access to the pin 27 and handle 30, when the booms are aligned, as shown in FIG. 9, I provide an access door 33 in the top of the boom section 16 adjacent its inner end, said door 33 being hinged as at 34, FIG. 9, and when opened giving full access to the eye 28 of the pin 27 and to the handle 30.

To unlock the boom from its aligned position shown in FIG. 9, access to the pin 27 and handle 30 is obtained through the open door 33. By pulling upwardly on the pin 27 by means of the eye 28 the spring loaded pin 27 will be retracted from the hole 29 in the guide 22 permitting the slides 23 and 24 to move axially on their guides 21, 22. Holding the pin 27 in raised position frees the slides 23 and 24 which can then be shoved back from the locked position shown in FIG. 12 to the unlocked position shown in FIG. 13 by means of a shove on the handle 30, thus freeing the lock between the booms 9 and 16, and booms 16 can now be hinged manually into the raised position shown in FIG. 10, and the booms 16 may be maintained locked in such raised position by applying the wing bolts 32 of the strips 31 into the holes 40 in the slides 24. The booms 16 may be returned to the down aligned position by reverse procedure of the above.

My aircraft as above described is designed with emphasis on compactness, since every portion is a self-contained unit contributing to efficient operation. Emphasis is placed on light weight brought about by the aircraft compactness, and on stability; and furthermore it is important that no control surface is disposed in disturbed air, or in any prop-wash.

I do not limit my invention to the exact form shown in the drawings, for obviously changes may be made therein within the scope of the claims.

I claim:

1. A single engine, push type, aircraft comprising a self-contained fuselage containing an instrument panel, flight controls and seats; non-retractable landing gear of tricycle type supported by the fuselage and having a nose wheel, and having side wheels arranged on outwardly and downwardly inclined struts extending from the fuselage; a single mono-type wing comprising a center section and two outboard sections, said wing being disposed above the rear portion of the fuselage; a pair of vertical stabilizers connecting the upper outer sides of the fuselage with the undersides of the wing center section, the aft portions of the stabilizers being hinged on vertical axes to form a pair of rudders which together form a venturi; an engine mounted on the wing center section and disposed above and behind the leading end of the fuselage; a propeller driven by said engine and disposed above the rear center of the fuselage; a pair of booms extending forwardly in parallel relation from opposite sides of the fuselage; and a horizontal stabilizer mounted on said booms forwardly of the fuselage, said horizontal stabilizer having a center section fixed to said booms and carrying a trim tab, and having elevators disposed outboard of the said center section.

2. In an aircraft as set forth in claim 1, high-speed wheel fairings for the said side wheels of the landing gear for streamlining purposes.

3. In an aircraft as set forth in claim 1, said wing sections carrying nagivation lights, landing lights, taxi light, and all fuel cells; also carrying the aileron and flap systems.

4. In an aircraft as set forth in claim 1, said engine having a nacelle provided with two ventilating air ducts, one disposed above and the other below the wing center section.

5. A single engine, push type, aircraft comprising a self-contained fuselage containing an instrument panel, flight controls and seats; non-retractable landing gear of tricycle type supported by the fuselage and having a nose wheel, and having side wheels arranged on outwardly and downwardly inclined struts extending from the fuselage; a single mono-type wing comprising a center section and two outboard sections, said wing being disposed above the rear portion of the fuselage; a pair of vertical stabilizers connecting the upper outer sides of the fuselage with the undersides of the wing center section, the aft portions of the stabilizers being hinged on vertical axes to form a pair of rudders which together form a venturi; an engine mounted on the wing center section and disposed above and behind the leading end of the fuselage; a propeller driven by said engine and disposed above the rear center of the fuselage; a pair of booms extending forwardly in parallel relation from opposite sides of the fuselage; a horizontal stabilizer mounted on said booms forwardly of the fuselage, said horizontal stabilizer having a center section fixed to said booms and carrying a trim tab, and having elevators disposed outboard of the said center section; said booms being each formed of two sections hinged together at a point disposed forwardly of the leading edge of the fuselage to allow the leading area of the booms and the horizontal stabilizer to be folded upwardly and backwardly to overlie the front portion of the fuselage; and means for locking the boom sections in aligned and hinged positions.

6. In an aircraft as set forth in claim 5, high-speed wheel fairings for the said side wheels of the landing gear for streamlining purposes.

7. In an aircraft as set forth in claim 5, said wing sections carrying navigation lights, landing lights, taxi light, and all fuel cells; also carrying the aileron and flap systems.

8. In an aircraft as set forth in claim 5, said engine having a nacelle provided with two ventilating air ducts, one disposed above and the other below the wing center section.

9. In an aircraft as set forth in claim 5, said boom sections being connected at their meeting ends by hinges disposed on the tops of the sections; fixed guides disposed axially within the boom sections adjacent their meeting ends; slides on the guides respectively having their adjacent ends pivotally connected together by a hinge pin normally disposed in the plane of the meeting ends of the boom sections when the sections are aligned, whereby as the boom sections are swung out of axial alignment the slides will be shifted in their guides outwardly of the ends of said sections.

10. In an aircraft as set forth in claim 9, said locking means for the boom sections when the sections are aligned comprising a spring biased locking pin on one of said slides adapted to normally engage a hole therefor in the related guide when the hinge pin is disposed in the plane of the meeting ends of the boom sections, said pin being manually releasable to permit hinging of the sections.

11. In an aircraft as set forth in claim 10, said pin being accessible through a door in the top of the related boom section; and a handle on the related boom section accessible through said door whereby the slides may be manually shifted when the pin is released.

12. In an aircraft as set forth in claim 9, said locking means for the boom sections when in hinged position comprising a pair of angularly disposed straps on one of the slides carrying wing bolts adapted to engage holes provided therefor in the other related slide to lock the slides in hinged position.

References Cited

UNITED STATES PATENTS

| 1,790,988 | 2/1931 | Lalli | 244—13 |
| 1,880,520 | 10/1932 | Stout | 244—13 |
| D. 150,434 | 8/1948 | Lovejoy et al. | 244—13 X |
| D. 163,818 | 7/1951 | Ramirez | 244—13 X |

FOREIGN PATENTS 545,819   10/1922   France.

FERGUS S. MIDDLETON, *Primary Examiner.*

B. BELKIN, *Assistant Examiner.*